(12) United States Patent
Bradbury et al.

(10) Patent No.: US 12,019,772 B2
(45) Date of Patent: Jun. 25, 2024

(54) STORING DIAGNOSTIC STATE OF SECURE VIRTUAL MACHINES

(71) Applicant: INTERNATIONAL BUSINESS MACHINES CORPORATION, Armonk, NY (US)

(72) Inventors: Jonathan D. Bradbury, Poughkeepsie, NY (US); Torsten Hendel, Holzgerlingen (DE); Reinhard Theodor Buendgen, Tuebingen (DE); Claudio Imbrenda, Boeblingen (DE); Christian Borntraeger, Stuttgart (DE); Janosch Andreas Frank, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 227 days.

(21) Appl. No.: 17/474,220

(22) Filed: Sep. 14, 2021

(65) Prior Publication Data
US 2023/0083083 A1   Mar. 16, 2023

(51) Int. Cl.
*G06F 21/62* (2013.01)
(52) U.S. Cl.
CPC .................. *G06F 21/6209* (2013.01)
(58) Field of Classification Search
CPC .................................................. G06F 21/6209
See application file for complete search history.

(56) References Cited

U.S. PATENT DOCUMENTS

| | | | | |
|---|---|---|---|---|
| 5,224,206 A | * | 6/1993 | Simoudis | G06F 11/2257 706/54 |
| 5,699,505 A | * | 12/1997 | Srinivasan | G06F 11/22 714/10 |
| 6,671,687 B1 | * | 12/2003 | Pederson | G06F 21/6227 707/999.009 |

(Continued)

FOREIGN PATENT DOCUMENTS

| | | |
|---|---|---|
| CN | 109154903 A | 1/2019 |
| CN | 107851151 B | 6/2020 |

(Continued)

OTHER PUBLICATIONS

Microsoft Learn, "About dump encryption", p. 1-3, Article published Sep. 17, 2020, learn.microsoft.com (Year: 2020).*

(Continued)

*Primary Examiner* — Vance M Little
(74) *Attorney, Agent, or Firm* — Edward J. Wixted, III; Blanche E. Schiller, Esq.; Heslin Rothenberg Farley & Mesiti P.C.

(57) ABSTRACT

At least one request to store diagnostic state of a virtual machine is obtained. Based on obtaining the at least one request, a store of diagnostic state of the virtual machine is performed to provide stored diagnostic state of the virtual machine. The performing the store includes encrypting the diagnostic state of the virtual machine that is unencrypted and being stored to prevent a reading of the diagnostic state of the virtual machine by an untrusted entity prior to encrypting the diagnostic state of the virtual machine that is unencrypted and being stored.

25 Claims, 11 Drawing Sheets

(56) References Cited

U.S. PATENT DOCUMENTS

| | | | |
|---|---|---|---|
| 6,738,928 B1* | 5/2004 | Brown | G06F 11/2268 |
| | | | 714/45 |
| 8,707,305 B2 | 4/2014 | Hendel | |
| 9,251,339 B2 | 2/2016 | Bullis et al. | |
| 9,286,152 B2 | 3/2016 | Semenko et al. | |
| 9,792,448 B2 | 10/2017 | Kaplan et al. | |
| 10,032,431 B2 | 7/2018 | Wilde et al. | |
| 10,083,128 B2 | 9/2018 | Bacher et al. | |
| 10,296,413 B2 | 5/2019 | Marshall et al. | |
| 10,366,227 B2 | 7/2019 | Bacher et al. | |
| 10,552,606 B2 | 2/2020 | Lango et al. | |
| 2007/0006226 A1* | 1/2007 | Hendel | G06F 9/45558 |
| | | | 718/1 |
| 2008/0155208 A1* | 6/2008 | Hiltgen | G06F 9/45533 |
| | | | 711/E12.001 |
| 2009/0024820 A1* | 1/2009 | Ponnuswamy | G06F 11/0778 |
| | | | 711/170 |
| 2009/0172409 A1* | 7/2009 | Bullis | G06F 21/554 |
| | | | 714/38.11 |
| 2009/0240953 A1 | 9/2009 | Paul | |
| 2011/0040808 A1* | 2/2011 | Joy | G06F 8/20 |
| | | | 707/E17.014 |
| 2015/0248357 A1 | 9/2015 | Kaplan et al. | |
| 2017/0315859 A1 | 11/2017 | Marshall et al. | |
| 2018/0081824 A1 | 3/2018 | Bacher | |
| 2018/0239909 A1 | 8/2018 | Tsirkin | |
| 2018/0341768 A1* | 11/2018 | Marshall | G06F 21/53 |
| 2019/0268318 A1 | 8/2019 | Tsirkin | |
| 2019/0286464 A1* | 9/2019 | Samprathi | G06F 9/45558 |
| 2020/0082782 A1 | 3/2020 | Wilde et al. | |
| 2020/0285747 A1* | 9/2020 | Borntraeger | G06F 21/12 |

FOREIGN PATENT DOCUMENTS

| | | |
|---|---|---|
| CN | 112860380 A | 5/2021 |
| TW | I622926 B | 3/2013 |

OTHER PUBLICATIONS

IBM, "z/Architecture—Principles of Operation," IBM Publication No. SA22-7832-12, Thirteenth Edition, Sep. 2019, pp. Jan. 2000.

Mell, Peter and Tim Grance, "The NIST Definition of Cloud Computing," National Institute of Standards and Technology, Information Technology Laboratory, Special Publication 800-145, Sep. 2011, pp. 1-7.

* cited by examiner

300

INITIATE CONFIGURATION DUMP CONTROL BLOCK

| LENGTH | COMMAND CODE | RESPONSE CODE | RETURN REASON CODE |
|---|---|---|---|
| 302 | 304 | 306 | 308 |
| SECURE CONFIGURATION CONTEXT HANDLE ~310 ||||

DUMP CPU STATE CONTROL BLOCK

| LENGTH | COMMAND CODE | RESPONSE CODE | RETURN REASON CODE |
|---|---|---|---|
| 402 | 404 | 406 | 408 |
| SECURE CPU CONTEXT HANDLE ~410 ||||
| SECURE CPU DUMP AREA ORIGIN ~412 ||||

FIG. 4A

SECURE CPU DUMP AREA 420

| SECURE CPU DUMP AREA VERSION ~422 | SECURE CPU DUMP AREA LENGTH ~424 |
|---|---|
| INITIALIZATION VECTOR ~426 ||
| GENERAL REGISTERS ~428 ||
| CURRENT PROGRAM STATUS WORD ~430 ||
| PREFIX ~432 | FLOATING-POINT CONTROL REGISTER ~434 |
| TIME-OF-DAY PROGRAMMABLE REGISTER ~436 ||
| CPU TIMER ~438 ||
| CLOCK COMPARATOR ~440 ||
| ACCESS REGISTERS ~442 ||
| CONTROL REGISTERS ~444 ||
| VECTOR REGISTERS ~446 ||
| GUARDED STORAGE DESIGNATION REGISTER ~448 ||
| GUARDED STORAGE SECTION MASK REGISTER ~450 ||
| GUARDED STORAGE EVENT PARAMETER LIST ADDRESS REGISTER ~452 ||
| . . . ||
| DUMP FLAGS ~454 ||
| SECURE CPU DUMP AREA TAG ~456 ||

CONVERT FROM SECURE STORAGE CONTROL BLOCK

| LENGTH | COMMAND CODE | RESPONSE CODE | RETURN REASON CODE |
|---|---|---|---|
| 472 | 474 | 476 | 478 |
| HOST ABSOLUTE ADDRESS ~480 ||||

FIG. 4C

500
DUMP CONFIGURATION STORAGE STATE CONTROL BLOCK

| LENGTH | COMMAND CODE | RESPONSE CODE | RETURN REASON CODE |
|---|---|---|---|
| 502 | 504 | 506 | 508 |
| SECURE CONFIGURATION CONTEXT HANDLE ~510 ||||
| SECURE CONFIGURATION STORAGE DUMP AREA ORIGIN ~512 ||||
| SECURE CONFIGURATION ABSOLUTE ADDRESS ~514 ||||

FIG. 5

600
COMPLETE CONFIGURATION DUMP CONTROL BLOCK

| LENGTH | COMMAND CODE | RESPONSE CODE | RETURN REASON CODE |
|---|---|---|---|
| 602 | 604 | 606 | 608 |
| SECURE CONFIGURATION CONTEXT HANDLE ~609 ||||
| KEY DERIVATION SEED ~610 ||||
| INITIALIZATION VECTOR ~612 ||||
| TWEAK NONCE ~614 ||||
| STORAGE ENCRYPTION KEY 1 ~616 ||||
| STORAGE ENCRYPTION KEY 2 ~618 ||||
| AUTHENTICATION TAG ~620 ||||

FIG. 6

OBTAIN AT LEAST ONE REQUEST TO STORE DIAGNOSTIC STATE OF A VIRTUAL MACHINE ~ 700

PERFORM, BASED ON OBTAINING THE AT LEAST ONE REQUEST, A STORE OF DIAGNOSTIC STATE OF THE VIRTUAL MACHINE TO PROVIDE STORED DIAGNOSTIC STATE OF THE VIRTUAL MACHINE ~ 702

>THE PERFORMING THE STORE INCLUDES ENCRYPTING THE DIAGNOSTIC STATE OF THE VIRTUAL MACHINE THAT IS UNENCRYPTED AND BEING STORED TO PREVENT A READING OF THE DIAGNOSTIC STATE OF THE VIRTUAL MACHINE BY AN UNTRUSTED ENTITY PRIOR TO ENCRYPTING THE DIAGNOSTIC STATE OF THE VIRTUAL MACHINE THAT IS UNENCRYPTED AND BEING STORED ~ 704

STORED DIAGNOSTIC STATE OF THE VIRTUAL MACHINE INCLUDES CONTENTS OF MEMORY OF THE VIRTUAL MACHINE ~ 706

STORED DIAGNOSTIC STATE OF THE VIRTUAL MACHINE INCLUDES CONTENTS OF ONE OR MORE PROCESSOR REGISTERS OF THE VIRTUAL MACHINE ~ 708

OBTAIN AN INITIATE STORE DIAGNOSTIC STATE REQUEST TO INITIATE STORING OF DIAGNOSTIC STATE OF THE VIRTUAL MACHINE ~ 710

THE INITIATE STORE DIAGNOSTIC STATE REQUEST TO BE USED TO OBTAIN A FIRST ENCRYPTION KEY TO BE USED IN ENCRYPTING AT LEAST A PORTION OF THE DIAGNOSTIC STATE OF THE VIRTUAL MACHINE THAT IS UNENCRYPTED AND BEING STORED ~ 712

FIG. 7A

THE OBTAINING THE AT LEAST ONE REQUEST INCLUDES OBTAINING A STORE DIAGNOSTIC PROCESSOR STATE REQUEST ~ 720

BASED ON OBTAINING THE STORE DIAGNOSTIC PROCESSOR STATE REQUEST, THE PERFORMING THE STORE OF THE DIAGNOSTIC STATE INCLUDES:

ENCRYPTING AT LEAST SELECT CONTENTS OF AT LEAST ONE PROCESSOR OF THE VIRTUAL MACHINE USING THE FIRST ENCRYPTION KEY TO PROVIDE ENCRYPTED PROCESSOR CONTENTS ~ 722

STORING THE ENCRYPTED PROCESSOR CONTENTS ~ 724

THE OBTAINING THE AT LEAST ONE REQUEST INCLUDES OBTAINING A CONVERT FROM SECURE MEMORY REQUEST ~ 726

BASED ON OBTAINING THE CONVERT FROM SECURE MEMORY REQUEST, THE PERFORMING THE STORE OF THE DIAGNOSTIC STATE INCLUDES:

ENCRYPTING AT LEAST SELECT CONTENTS OF MEMORY OF THE VIRTUAL MACHINE THAT ARE UNENCRYPTED USING A SECOND ENCRYPTION KEY TO PROVIDE ENCRYPTED CONTENTS OF MEMORY ~ 730

STORING THE ENCRYPTED CONTENTS OF MEMORY ~ 732

THE PERFORMING THE STORE OF THE DIAGNOSTIC STATE, BASED ON OBTAINING THE CONVERT FROM SECURE MEMORY REQUEST, INCLUDES:

DETERMINING WHETHER A UNIT OF MEMORY FOR WHICH CONTENTS ARE TO BE STORED IS ENCRYPTED ~ 736

ENCRYPTING THE UNIT OF MEMORY USING THE SECOND ENCRYPTION KEY, BASED ON DETERMINING THE UNIT OF MEMORY IS UNENCRYPTED, WHEREIN UNITS OF MEMORY THAT ARE ENCRYPTED ARE NOT RE-ENCRYPTED ~ 738

FIG. 7B

```
┌─────────────────────────────────────────────────────────────────────┐
│  ┌───────────────────────────────────────────────────────────────┐  │
│  │ THE STORED DIAGNOSTIC STATE INCLUDES ENCRYPTED CONTENTS OF    │  │
│  │ MEMORY ─┐                                                     │  │
│  │         750                                                   │  │
│  │ OBTAINING A STORE DIAGNOSTIC MEMORY STATE REQUEST ~752        │  │
│  │                                                               │  │
│  │ STORING, BASED ON OBTAINING THE STORE DIAGNOSTIC MEMORY STATE │  │
│  │ REQUEST, METADATA TO BE USED TO DECRYPT THE ENCRYPTED         │  │
│  │ CONTENTS OF MEMORY ~754                                       │  │
│  └───────────────────────────────────────────────────────────────┘  │
│                                                                     │
│  ┌───────────────────────────────────────────────────────────────┐  │
│  │ THE METADATA INCLUDES ONE OR MORE SELECT COMPONENT VALUES     │  │
│  │ TO BE USED TO CREATE ONE OR MORE SELECT VALUES TO BE USED TO  │  │
│  │ DECRYPT THE ENCRYPTED CONTENTS OF MEMORY ~756                 │  │
│  └───────────────────────────────────────────────────────────────┘  │
│                                                                     │
│  ┌───────────────────────────────────────────────────────────────┐  │
│  │ OBTAINING A COMPLETE REQUEST TO COMPLETE THE STORING OF       │  │
│  │ DIAGNOSTIC STATE ~760                                         │  │
│  │                                                               │  │
│  │ PROVIDING, BASED ON OBTAINING THE COMPLETE REQUEST, DATA TO   │  │
│  │ BE USED TO DECRYPT ENCRYPTED STORED DIAGNOSTIC STATE OF THE   │  │
│  │ VIRTUAL MACHINE ~762                                          │  │
│  └───────────────────────────────────────────────────────────────┘  │
│                                                                     │
│  ┌───────────────────────────────────────────────────────────────┐  │
│  │ THE DATA INCLUDES A SECOND ENCRYPTION KEY USED IN DECRYPTION  │  │
│  │ OF ENCRYPTED CONTENTS OF MEMORY AND A NONCE VALUE TO BE USED  │  │
│  │ TO CREATE ONE OR MORE SELECT VALUES TO BE USED IN             │  │
│  │ ENCRYPTION ~770                                               │  │
│  │                                                               │  │
│  │ AT LEAST A PORTION OF THE DATA IS ENCRYPTED ~772              │  │
│  └───────────────────────────────────────────────────────────────┘  │
└─────────────────────────────────────────────────────────────────────┘
```

FIG. 7C

STORING DIAGNOSTIC STATE OF SECURE VIRTUAL MACHINES

BACKGROUND

One or more aspects relate, in general, to facilitating processing within a computing environment, and in particular, to improving such processing.

A storing of diagnostic state of a virtual machine (also referred to as a virtual machine dump) provides the state of a virtual machine in a file for later analysis. It is often used for finding the root cause of a virtual machine failure. The state of the virtual machine includes, for instance, a copy of the memory of the virtual machine, as well as a copy of select registers of one or more central processing units of the virtual machine.

Some virtual machines are secure virtual machines in which the hardware and firmware of a computer system denies access to the state of a secure virtual machine except for special memory areas that the virtual machine actively designates as shared. Such a virtual machine cannot be accessed by the hypervisor or the administrator of the operating system that hosts the virtual machine, as would normally be possible. Access to the virtual machine's state means that an authorized entity on the host system can read sensitive information, like encryption keys or confidential documents from the virtual machine memory, which is a security risk.

Processing associated with virtual machines, including storing diagnostic state of a virtual machine, such as a secure virtual machine, is to be facilitated.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes obtaining at least one request to store diagnostic state of a virtual machine. Based on obtaining the at least one request, a store of diagnostic state of the virtual machine is performed to provide stored diagnostic state of the virtual machine. The performing the store includes encrypting the diagnostic state of the virtual machine that is unencrypted and being stored to prevent a reading of the diagnostic state of the virtual machine by an untrusted entity prior to encrypting the diagnostic state of the virtual machine that is unencrypted and being stored.

Diagnostic state of a virtual machine (e.g., a secure virtual machine) may be stored while maintaining the security of the state of the virtual machine which is being stored for diagnostic purposes.

As examples, the stored diagnostic state of the virtual machine includes contents of memory of the virtual machine and/or the stored diagnostic state of the virtual machine includes contents of one or more processor registers of the virtual machine.

In one example, an initiate store diagnostic state request to initiate storing of diagnostic state of the virtual machine is obtained. The initiate store diagnostic state request is to be used to obtain a first encryption key to be used in encrypting at least a portion of the diagnostic state of the virtual machine that is unencrypted and being stored.

In one example, the obtaining the at least one request includes obtaining a store diagnostic processor state request. Based on obtaining the store diagnostic processor state request, the performing the store of the diagnostic state includes, for instance, encrypting at least select contents of at least one processor of the virtual machine using the first encryption key to provide encrypted processor contents, and storing the encrypted processor contents.

In one example, the obtaining the at least one request includes obtaining a convert from secure memory request. Based on obtaining the convert from secure memory request, the performing the store of the diagnostic state includes, for instance, encrypting at least select contents of memory of the virtual machine that are unencrypted using a second encryption key to provide encrypted contents of memory, and storing the encrypted contents of memory.

As an example, the performing the store of the diagnostic state, based on obtaining the convert from secure memory request, includes, for instance, determining whether a unit of memory for which contents are to be stored is encrypted, and encrypting the unit of memory using the second encryption key, based on determining the unit of memory is unencrypted, wherein units of memory that are encrypted are not re-encrypted.

By encrypting the unencrypted contents (and not re-encrypting encrypted state), processing cycles and complexity are reduced, improving system performance.

In one example, the stored diagnostic state includes encrypted contents of memory. Further, in one example, a store diagnostic memory state request is obtained, and based on obtaining the store diagnostic memory state request, metadata to be used to decrypt the encrypted contents of memory is stored.

As an example, the metadata includes one or more select component values to be used to create one or more select values to be used to decrypt the encrypted contents of memory.

In one example, a complete request to complete the storing of diagnostic state is obtained, and based on obtaining the complete request, data to be used to decrypt encrypted stored diagnostic state of the virtual machine is provided.

As an example, the data includes a second encryption key used in decryption of encrypted contents of memory and a nonce value to be used to create one or more select values to be used in encryption. Further, in one example, at least a portion of the data is encrypted.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 depicts one example of an initiate configuration dump control block, in accordance with one or more aspects of the present invention;

FIG. 4A depicts one example of a dump central processing unit (CPU) state control block, in accordance with one or more aspects of the present invention;

FIG. 4B depicts one example of a secure central processing unit dump area, in accordance with one or more aspects of the present invention;

FIG. 4C depicts one example of a convert from secure storage control block used in accordance with one or more aspects of the present invention;

FIG. 5 depicts one example of a dump configuration storage state control block, in accordance with one or more aspects of the present invention;

FIG. 6 depicts one example of a complete configuration dump control block, in accordance with one or more aspects of the present invention;

FIGS. 7A-7C depict one example of facilitating processing within a computing environment, in accordance with one or more aspects of the present invention;

DETAILED DESCRIPTION

Figure 1:
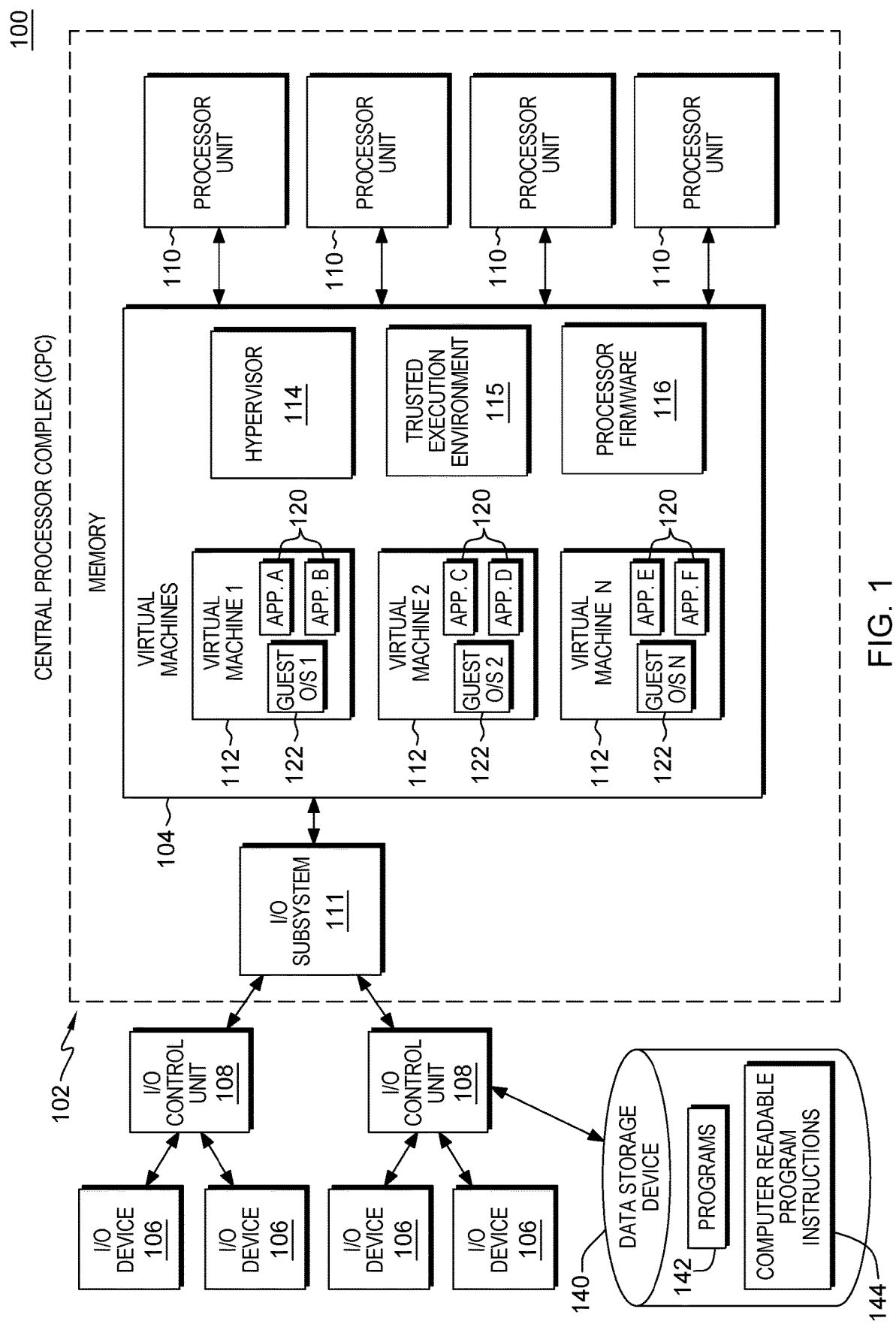
FIG. 1 depicts one example of a computing environment to incorporate and use one or more aspects of the present invention.

In accordance with one or more aspects of the present invention, a capability is provided to facilitate processing within a computing environment. As an example, the capability includes a technique in which diagnostic state of a virtual machine (e.g., a secure virtual machine) may be stored (also referred to as dumped) while maintaining the security of the virtual machine's state that is being stored. As an example, the diagnostic state is encrypted before it is readable by an untrusted entity (e.g., a hypervisor).

In one example, contents of memory of a virtual machine that is to be stored for diagnostic analysis (i.e., dumped) may be encrypted by, for instance, using a selected key, referred to as a dump key (also referred to as a first encryption key). For instance, memory that is paged-out and currently encrypted with a paging key (also referred to as a second encryption key) is decrypted and re-encrypted with the selected key. As another example, in accordance with an aspect of the present invention, to reduce complexity and the number of central processing unit cycles used, instead of re-encrypting the encrypted memory (encrypted using the paging key), select unique values (e.g., tweak values) for the units of memory (e.g., pages of memory) are provided and the paging key is encrypted with the selected key. Thus, paged-out pages do not need to be re-encrypted for dumping and only pages that are not yet encrypted are encrypted for dumping. To further explain, each unit of memory is given a value that is, e.g., an unsigned integer, which is called the tweak value or select unique value. These values start from an arbitrary integer and are assigned consecutively. The value may be converted to, e.g., a little-endian byte array, where encryption of the value may be performed using, e.g., the AES (Advanced Encryption Standard) algorithm.

In one or more aspects, to securely facilitate a dump or diagnostic store of a virtual machine (e.g., a secure virtual machine), an application programming interface is provided and used, which employs an instruction referred to as an Ultravisor Call. The Ultravisor Call instruction is used to initiate one or more commands to be used to store diagnostic state of a secure virtual machine. These commands include, for instance, an initiate configuration dump command, a dump central processing unit state command, a convert from secure storage command, a dump configuration storage state command, and a complete configuration dump command, each of which is further described below.

One embodiment of a computing environment to incorporate and use one or more aspects of the present invention is described with reference to FIG. 1. As an example, the computing environment is based on the z/Architecture® instruction set architecture, offered by International Business Machines Corporation, Armonk, New York. One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Referring to FIG. 1, in one example, a computing environment 100 includes a central processor complex (CPC) 102. Central processor complex 102 is, for instance, an IBM Z® server (or other server or machine offered by International Business Machines Corporation or other entities) and includes a plurality of components, such as, for instance, a memory 104 (a.k.a., system memory, main memory, main storage, central storage, storage) coupled to one or more processor units (also referred to as processors) 110 and to an input/output (I/O) subsystem 111. Example processor units 110 include one or more general-purpose processors (a.k.a., central processors or central processing units (CPUs)) and/or one or more other processors. IBM Z is a trademark or registered trademark of International Business Machines Corporation in at least one jurisdiction.

I/O subsystem 111 can be a part of the central processor complex or separate therefrom. It directs the flow of information between main storage 104 and input/output control units 108 and input/output (I/O) devices 106 coupled to the central processor complex.

Many types of I/O devices may be used. One particular type is a data storage device 140. Data storage device 140 can store one or more programs 142, one or more computer readable program instructions 144, and/or data, etc. The computer readable program instructions can be configured to carry out functions of embodiments of aspects of the invention.

Central processor complex 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central processor complex 102. Examples include, but are not limited to: microcode or millicode, device drivers, redundant processing units, external disk drive arrays, RAID systems, tape drives, and data archival storage systems, etc.

Further, central processor complex 102 can be operational with numerous other general-purpose or special-purpose computing system environments or configurations. Examples of well-known computing systems, environments, and/or configurations that may be suitable for use with central processor complex 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Central processor complex 102 provides, in one or more embodiments, virtualization support, in which memory 104 includes, for example, one or more virtual machines 112 (also referred to as guests), a virtual machine manager, such as a hypervisor 114, that manages the virtual machines, a trusted execution environment 115 and processor firmware 116. One example of hypervisor 114 is the z/VM® hypervisor, offered by International Business Machines Corporation, Armonk, New York. The hypervisor is sometimes referred to as a host. z/VM is a trademark or registered trademark of International Business Machines Corporation in at least one jurisdiction.

In one or more embodiments, trusted execution environment 115 may be implemented, at least in part, in hardware and/or firmware configured to perform, for instance, processes such as described herein. The trusted execution environment is trusted firmware (referred to as an ultravisor) and/or hardware that makes use of memory-protection hardware to enforce memory protection. The owner of a guest can securely pass information (using, e.g., IBM Secure Execution) to the trusted execution environment by using a public host key, which is embedded in a host key document. To process the confidential information, the trusted execution environment uses a matching private host key. The private host key is specific to the server, e.g., the IBM Z® server, and is hardware protected.

Processor firmware 116 includes, e.g., the microcode or millicode of a processor. It includes, for instance, the hardware-level instructions and/or data structures used in implementation of higher-level machine code. In one embodiment, it includes, for instance, proprietary code that is typically delivered as microcode or millicode that includes trusted software, microcode or millicode specific to the underlying hardware and controls operating system access to the system hardware.

The virtual machine support of the central processor complex provides the ability to operate large numbers of virtual machines (also referred to as guests) 112, each capable of operating with different programs 120 and running a guest operating system 122, such as the Linux® operating system. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a world-wide basis.

In one embodiment, one or more virtual machines 112 are secure virtual machines. A secure virtual machine is started by a hypervisor (e.g., hypervisor 114) in a manner that the hypervisor cannot observe the state (e.g., memory, registers, etc.) of the secure virtual machine. For instance, in one embodiment of confidential computing, the hypervisor can start/stop a secure virtual machine, and the hypervisor knows where data used to start the secure virtual machine is located but it cannot look into the running secure virtual machine. Data used to load/start the secure virtual machine may be encrypted in a manner that the hypervisor cannot see the secure machine. The owner of the secure virtual machine image places confidential data in the secure guest metadata and then generates a secure virtual machine image together with the secure guest metadata. After the secure virtual machine is loaded, any interaction with the state of the secure virtual machine is processed by a trusted execution environment, such as trusted execution environment 115.

In accordance with an aspect of the present invention, diagnostic state of a secure virtual machine may be stored (i.e., a secure virtual machine may be dumped) while maintaining the security of the virtual machine's state. In one example, the diagnostic state is encrypted before it is readable by an untrusted entity (e.g., the hypervisor). To securely facilitate a dump of a secure virtual machine, in accordance with one or more aspects, an application programming interface to the hardware and firmware is used. The application programming interface allows the hypervisor to access an encrypted version of the virtual machine state which can be passed on to the owner of the virtual machine. The owner (e.g., exclusively) can then decrypt the state and get the unencrypted virtual machine dump for analysis since the owner is the instance (e.g., only instance) with the decryption key for the encrypted dump. For instance, metadata used to start the virtual machine includes a confidential key, referred to herein as an owner key or a communication key, that is protected such that, e.g., only the trusted firmware can obtain the confidential owner key. That key is used, e.g., exclusively to decrypt the encrypted diagnostic data.

As one example, the application programming interface is divided into a plurality of Ultravisor Calls for a plurality of commands, including, for instance, an initiate configuration dump command, a dump central processing unit state command, a convert from secure storage command, a dump configuration storage state command, and a complete configuration dump command. For instance, each command is specified in an execution of an Ultravisor Call instruction that includes, in one embodiment, an opcode specifying an Ultravisor Call operation and a plurality of operands. As an example, when a third operand of the instruction (e.g., an immediate field) specifies zero, a normal command is specified and a second operand of the instruction (e.g., a register) points to an ultravisor control block in storage that specifies the command to be executed by the ultravisor (or other trusted entity).

Example commands and control blocks to be used for storing diagnostic state that may be specified by the Ultravisor Call instruction are described with reference to FIGS. 2-6. For instance, FIG. 2 depicts a processing flow that employs the commands, and FIGS. 3-6 depicts various control blocks/information used by the commands, in accordance with one or more aspects of the present invention.

Figure 2:
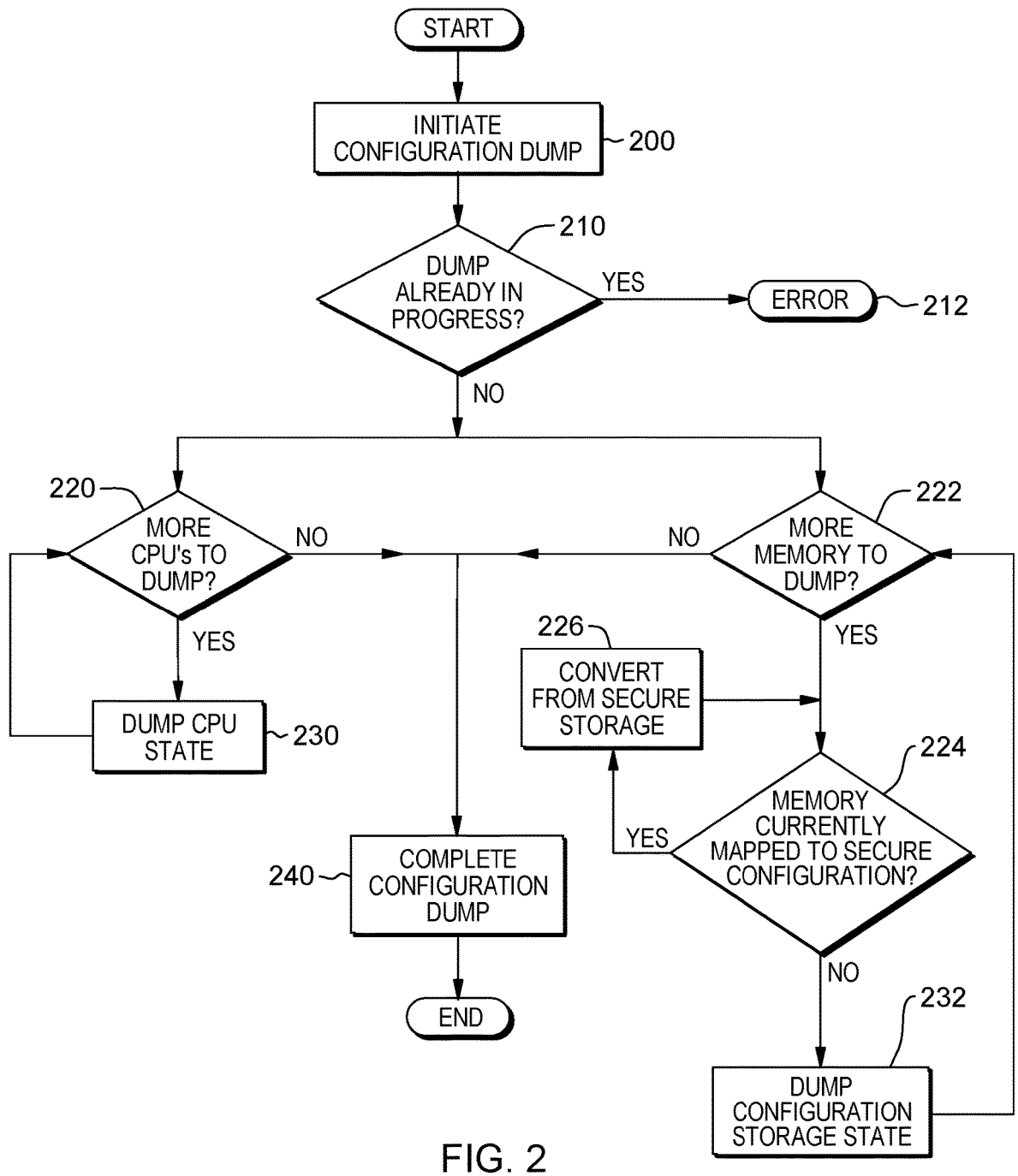
FIG. 2 depicts one example of storing diagnostic state of a configuration (e.g., a virtual machine), also referred to as performing a configuration dump, in accordance with one or more aspects of the present invention.

Referring initially to FIG. 2, an initiate configuration dump command (also referred to as an initiate store diagnostic request) is called 200. For instance, the Ultravisor Call instruction is issued by, e.g., the hypervisor (e.g., hypervisor 114), which specifies a pointer to a control block that includes the initiate configuration dump command to be executed by, e.g., a trusted entity, such as the ultravisor. An example of such a control block is described with reference to FIG. 3.

In one example, an initiate configuration dump ultravisor control block 300 includes, for instance, the following fields:

Length 302: This field (e.g., bytes 0-1) includes, e.g., an unsigned binary integer (e.g., 16 bits) whose value specifies the length of the control block (also referred to as a parameter block) in bytes. The length is to specify a select value (e.g., 40 hex); otherwise, a select response code (e.g., 0005 hex) applies.

Command Code 304: This field (e.g., bytes 2-3) includes an unsigned binary integer (e.g., 16 bits) whose value specifies the command code for the initiate configuration dump Ultravisor Call command.

Response Code 306: This field (e.g., bytes 4-5) includes an unsigned binary integer (e.g., 16 bits) which specifies a response code. This value is stored when the operation completes.

Return Reason Code 308: This field (e.g., bytes 6-7) includes the return reason code.

Secure Configuration Context Handle 310: This field (e.g., bytes 24-31) includes a value (e.g., 64-bit value) that identifies the secure configuration (e.g., virtual machine) which is to initialize the dump process on.

If a special condition exists, a response code other than a select code (e.g., 0001 hex) is stored in the Ultravisor Call control block. Special conditions for the initiate configuration dump Ultravisor Call include, for instance:

0003 hex: The initiate configuration dump Ultravisor Call command was issued in a configuration that has not issued a successfully executed initialize Ultravisor Call command.

0005 hex: The initiate configuration dump Ultravisor Call command was issued with a length that is not equal to a select value (e.g., 40 hex).

0020 hex: The secure configuration context handle is not a valid handle for a defined secure configuration.

0101 hex: Configuration not authorized to dump.

0102 hex: A verify unpacked image Ultravisor Call has not successfully completed for the specified configuration.

0103 hex: Dump already in progress for configuration.

The initiate configuration dump Ultravisor Call is used to initialize the dump process for the specified secure configuration (e.g., secure virtual machine). As part of the initialization, a unique dump key (e.g., an encryption key, referred to herein for clarity as a first encryption key) is derived for dumping select secure configuration data (e.g., encrypted processor state). As an example, the command derives the dump key from a saved customer communication key (e.g., owner key) and a key derivation seed. This key is saved and may later be used to encrypt data provided via other commands.

In one example, a verify unpacked image Ultravisor Call (used to verify the integrity of an unpacked image—a secure and deciphered image) targeting the specified configuration is to have successfully completed; otherwise, no operation is performed and a selected response code (e.g., 0101 hex) is stored. If another initiate configuration dump Ultravisor Call has successfully completed for the specified configuration without a successfully completed complete configuration dump Ultravisor Call, no operation is performed and a selected response code (e.g., 0102 hex) is stored.

In one example, a dump process is not to be initiated if the secure virtual machine is still in the setup process since the state of the virtual machine is known to the owner up to the point where the first instruction is executed. Further, as indicated, this command initiates the dump process, which enables the other application programming interface commands to be called by the hypervisor. After the dump process is initiated, no second dump process is to be initiated for this secure virtual machine until the current process has been completed. Thus, in one example, based on executing the initiate configuration dump command, a determination is made as to whether a dump (also referred to as a store diagnostic state) is already in progress for a select configuration (e.g., virtual machine) 210. If a dump is already in progress for the configuration, then an error is indicated, in one example, for this processing 212. However, if a dump is not already in progress for the configuration, then processing continues, as described herein.

For instance, based on initiating the configuration dump, a determination is made as to whether state of the virtual machine is to be dumped. Returning to FIG. 2, an inquiry is made as to whether state of one or more central processing units is to be dumped 220. If state of one or more central processing units is to be dumped, then a dump central processing unit state command (also referred to as a store diagnostic processor state request) is initiated 230. For instance, the Ultravisor Call instruction is issued by, e.g., the hypervisor, which specifies a pointer to a control block that includes the dump central processing unit state command to be executed by, e.g., the trusted entity. An example of such a call control block is described with reference to FIG. 4A.

In one example, a dump central processing unit state Ultravisor Call control block 400 includes, for instance, the following fields:

Length 402: This field (e.g., bytes 0-1) includes, e.g., an unsigned binary integer (e.g., 16 bits) whose value specifies the length of the control block in bytes. The length is to specify a select value (e.g., 50 hex); otherwise, a select response code (e.g., 0005 hex) applies.

Command Code 404: This field (e.g., bytes 2-3) includes an unsigned binary integer (e.g., 16 bits) whose value specifies the command code for the dump central processing unit state Ultravisor Call command.

Response Code 406: This field (e.g., bytes 4-5) includes an unsigned binary integer (e.g., 16 bits) which specifies a response code. This value is stored when the operation completes.

Return Reason Code 408: This field (e.g., bytes 6-7) includes the return reason code. For the dump central processing unit state Ultravisor Call command, this field is, e.g., zero.

Secure Central Processing Unit Context Handle 410: This field (e.g., bytes 24-31) includes a value (e.g., a 64-bit value) that identifies the secure central processing unit whose state is to be dumped.

Secure Central Processing Unit Dump Area Origin 412: This field (e.g., bits 0-51 of bytes 32-39) with a select number (e.g., 12) of zeros appended includes a logical address (e.g., 64-bit logical address) of a secure central processing unit dump area.

If a special condition exists, a response code other than a select code (e.g., 0001 hex) is stored in the Ultravisor Call control block. Special conditions for the dump central processing unit state Ultravisor Call include, for instance:

0003 hex: The dump central processing unit state Ultravisor Call command was issued in a configuration that has not issued a successfully executed initialize Ultravisor Call command.

0005 hex: The dump central processing unit state Ultravisor Call command was issued with a length that is not equal to a select value (e.g., 50 hex).

0021 hex: The secure central processing unit context handle is not a valid handle for a defined secure central processing unit.

0101 hex: An initiate configuration dump Ultravisor Call has not completed on the secure configuration containing the specified secure central processing unit.

0102 hex: Central processing unit state for the specified central processing unit has already been dumped.

0103 hex: Specified secure central processing unit is currently executing.

0104 hex: Access exception recognized when trying to access the secure central processing unit dump area.

One example of a format of the secure central processing unit dump area is described with reference to FIG. 4B. As an example, a secure central processing unit dump area 420 includes:

Secure Central Processing Unit Dump Area Version 422: This field (e.g., bytes 0-3) includes an unsigned binary integer (e.g., 32-bit) whose value specifies the version of the secure central processing unit dump area written by the ultravisor. The version number defines the layout of the other fields in the secure central processing unit dump area.

Secure Central Processing Unit Dump Area Length 424: This field (e.g., bytes 4-7) includes an unsigned binary integer (e.g., 32-bit) whose value specifies the number of bytes of data written by the ultravisor to the secure central processing unit dump area.

Initialization Vector 426: This field (e.g., bytes 8-19) includes an unique initialization vector used by the ultravisor when performing, e.g., the AES 256-GCM (Galois/Counter Mode) encryption of the secure central processing unit dump area.

General Registers 428: This field (e.g., bytes 32-159) includes the contents of select general registers (e.g., general registers 0 to 15) for the specified secure central processing unit.

Current Program Status Word 430: This field (e.g., bytes 160-175) includes the contents of the current program status word for the specified secure central processing unit.

Prefix 432: This field (e.g., bytes 184-187) includes select bits (e.g., bits 32 to 63) of a prefix register for the specified secure central processing unit.

Floating-Point Control Register 434: This field (e.g., bytes 188-191) includes a floating-point control register for the specified secure central processing unit.

Time-of-Day (TOD) Programmable Register 436: This field (e.g., bytes 196-199) includes a time-of-day programmable register for the specified secure central processing unit.

Central Processing Unit Timer 438: This field (e.g., bytes 200-207) includes a central processing unit timer for the specified secure central processing unit.

Clock Comparator 440: This field (e.g., bytes 209-215) includes select bits (e.g., bits 0-55) of a clock comparator for the specified secure central processing unit.

Access Registers 442: This field (e.g., bytes 224-287) includes the contents of select access registers (e.g., access registers 0 to 15) for the specified secure central processing unit.

Control Registers 444: This field (e.g., bytes 288-415) includes the contents of select control registers (e.g., control registers 0 to 15) for the specified secure central processing unit.

Vector Registers 446: This field (e.g., bytes 416-927) includes the contents of select vector registers (e.g., vector registers 0 to 31) for the specified secure central processing unit.

Guarded Storage Designation Register 448: This field (e.g., bytes 1448-1455) includes the contents of a guarded storage designation register for the specified secure central processing unit.

Guarded Storage Section Mask Register 450: This field (e.g., bytes 1456-1463) includes the contents of a guarded storage section mask register for the specified secure central processing unit.

Guarded Storage Event Parameter List Address Register 452: This field (e.g., bytes 1464-1471) includes the contents of a guarded storage event parameter list address register for the specified secure central processing unit.

Dump Flags 454: This field (e.g., bytes 1536-1537) includes flags that convey information about the dumped central processing unit contents. An example flag (e.g., bit 0) includes an outstanding secure instruction interception processing indicator. When this flag is set, partial instruction results may be contained in the dumped central processing unit state.

Secure Central Processing Unit Dump Area Tag 456: This field (e.g., last 16 bytes of the secure central processing unit dump area) includes the authentication tag used to verify the authenticity of the contents of the area.

In one example, fields 422-426 are authenticated and fields 428-454 are encrypted.

The dump central processing unit ultravisor command may be executed for every central processing unit (or a subset thereof) of the virtual machine and it yields the encrypted state of the central processing unit. The encryption of the state of the virtual machine is performed with, e.g., the dump key. The encrypted central processing state may include, but is not limited to, contents of general registers, control registers, floating-point registers, vector registers, as well as timers, the floating-point control register and/or the current instruction address. Further, in one example, it includes an unencrypted area. In this area, an initialization vector used for the encryption of the data, as well as a length and version indication to facilitate later decryption and interpretation of the dump data are saved, as examples.

This command is used to dump the encrypted contents of the specified secure central processing unit (or another processor unit). The secure central processing unit dump area includes, for instance, a plain text header which includes version information, size of encrypted data, and the initialization vector used for the encryption of the central processing unit state. The central processing unit state is encrypted using, e.g., AES-GCM with the 256-bit dump key.

The authentication tag for the encrypted central processing unit dump area is stored directly after the encrypted area. The length of the secure central processing unit dump area is, e.g., less than or equal to the secure central processing unit storage length returned by, for instance, a query Ultravisor Call command.

An initiate configuration dump Ultravisor Call command is to have successfully completed before issuing a dump central processing unit state Ultravisor Call command; otherwise, a select response code (e.g., 0101 hex) is stored. If the dump central processing unit state Ultravisor Call command is issued more than one time for a specified Secure Central Processing Unit Context Handle between an initiate configuration dump Ultravisor Call command and a complete configuration dump Ultravisor Call command, a select response code (e.g., 0102 hex) is stored. If the specified secure central processing unit is currently executing, a select response code (e.g., 0103 hex) is stored.

Returning to FIG. 2, in one example, based on initiating the configuration dump 200, a determination is also made as to whether memory of the virtual machine is to be dumped 222. If memory is to be dumped, the dumping occurs during a page-out process, in one example. A determination is made, for instance, as to whether the memory being dumped is currently mapped to a secure configuration (e.g., a secure virtual machine) 224. If the memory being dumped is mapped to a secure configuration, then in one example, a convert from secure storage command is initiated 226. For instance, the Ultravisor Call instruction is issued by, e.g., the hypervisor specifying a convert from secure storage control block, which specifies a convert from secure storage command to be executed by, e.g., the ultravisor. One example of such a control block is described with reference to FIG. 4C.

In one example, a convert from secure storage Ultravisor Call control block 470 includes, for instance, the following fields:

Length 472: This field (e.g., bytes 0-1) includes, e.g., an unsigned binary integer (e.g., 16 bits) whose value specifies the length of the control block in bytes. The length is to specify a select value (e.g., 20 hex); otherwise, a select response code (e.g., 0005 hex) applies.

Command Code 474: This field (e.g., bytes 2-3) includes an unsigned binary integer (e.g., 16 bits) whose value specifies the command code for the convert from secure storage Ultravisor Call command.

Response Code 476: This field (e.g., bytes 4-5) includes an unsigned binary integer (e.g., 16 bits) which specifies a response code. This value is stored when the operation completes.

Return Reason Code 478: This field (e.g., bytes 6-7) includes the return reason code. When a response code of, e.g., '0001' hex is stored, a return reason code of, e.g., '0000' hex is stored when the security properties of the specified unit of memory (e.g., block of storage) are modified. If the security properties of the specified unit of memory are already set to the desired state, return reason code, e.g., '0001' is stored.

Host Absolute Address 480: This field (e.g., bits 0-51 of bytes 32-39) with a select number, e.g., 12 of zero bits appended on the right forms an absolute address of a unit of memory (e.g., a 4 K-byte block of storage) to convert to non-secure storage.

If a special condition exists, a response code other than a select code (e.g., 0001 hex) is stored in the Ultravisor Call control block. Special conditions for the convert from secure storage Ultravisor Call include, for instance:

0003 hex: The convert from secure storage Ultravisor Call command was issued in a configuration that has not issued a successfully executed initialize Ultravisor Call command.

0005 hex: The convert from secure storage Ultravisor Call command was issued with a length that is not equal to a select value (e.g., 20 hex).

0030 hex: Home address space control element has R bit (e.g., bit 58) set to, e.g., one.

0031 hex: Translation exception trying to access configuration variable storage area.

0032 hex: The secure guest variable storage area contains a virtual address that translates to a region-frame absolute address or a segment-frame absolute address.

0103 hex: The host absolute address is not available in the host configuration.

0104 hex: The host absolute address is ultravisor storage.

0105 hex: The corresponding host virtual address has been converted from secure storage too many times.

As one example, the convert from secure storage ultravisor command is used to dump secure memory, in which the units of memory (e.g., pages of memory) being dumped are encrypted using, e.g., the paging key, and stored. The convert from secure storage command modifies the security properties of a unit of memory (e.g., a 4 K-byte block of storage) associated with a secure configuration to be non-secure storage. If the specified unit of memory is already defined to be non-secure storage, the operation completes without further action and a select response code (e.g., '0001' hex) and a select return reason code (e.g., '0001' hex) are stored. If the unit of memory is not defined-shared storage, a digest is created from the contents of the unit of memory. This digest is preserved by the trusted entity (e.g., ultravisor), in one example. The contents of the unit of memory are enciphered (e.g., using the paging key) and then the unit of memory is made to be non-secure. If the unit of memory is defined shared storage, the unit of memory is made to be non-secure with no modifications to the contents of the unit of memory.

If the specified host absolute address is owned by the trusted entity, the specified unit of memory is unchanged and a chosen response code (e.g., '0104' hex) is stored.

Subsequent to converting from secure storage, referring to FIG. 2, processing continues to inquiry 224. If the memory to be dumped is not currently mapped to a secure configuration, then a dump configuration storage state command (also referred to as a store diagnostic memory state request) is initiated 232. For instance, an Ultravisor Call instruction is issued by, e.g., the hypervisor specifying a pointer to a dump configuration storage state control block that specifies the dump configuration storage state command to be executed by, e.g., the ultravisor. One example of such a control block is described with reference to FIG. 5.

In one example, a dump configuration storage state Ultravisor Call control block 500 includes, for instance, the following fields:

Length 502: This field (e.g., bytes 0-1) includes, e.g., an unsigned binary integer (e.g., 16 bits) whose value specifies the length of the control block in bytes. The length is to specify a select value (e.g., 58 hex); otherwise, a select response code (e.g., 0005 hex) applies.

Command Code 504: This field (e.g., bytes 2-3) includes an unsigned binary integer (e.g., 16 bits) whose value specifies the command code for the dump configuration storage state Ultravisor Call command.

Response Code 506: This field (e.g., bytes 4-5) includes an unsigned binary integer (e.g., 16 bits) which specifies a response code. This value is stored when the operation completes.

Return Reason Code 508: This field (e.g., bytes 6-7) includes the return reason code. For the dump configuration storage state Ultravisor Call command, this field is, e.g., zero.

Secure Configuration Context Handle 510: This field (e.g., bytes 24-31) includes a value (e.g., a 64-bit value) that identifies the secure configuration whose state should be dumped.

Secure Configuration Storage Dump Area Origin 512: This field (e.g., bits 0-51 of bytes 32-39) with a select number (e.g., 12) of zeros appended includes a logical address (e.g., 64-bit logical address) of a secure configuration storage dump area.

Secure Configuration Absolute Address 514: This field (e.g., bits 0-43 of bytes 40-47) with a select number (e.g., 20) of zeros appended includes a secure configuration absolute address (e.g., 64-bit address) of the first frame of, e.g., 256 frames of storage to store the select unique components (e.g., tweak components).

If a special condition exists, a response code other than a select code (e.g., 0001 hex) is stored in the Ultravisor Call control block. Special conditions for the dump configuration storage state Ultravisor Call include, for instance:

0003 hex: The dump configuration storage state Ultravisor Call command was issued in a configuration that has not issued a successfully executed initialize Ultravisor Call command.

0005 hex: The dump configuration storage state Ultravisor Call command was issued with a length that is not equal to a select value (e.g., 50 hex).

0020 hex: The secure configuration context handle is not a valid handle for a defined secure configuration.

0031 hex: Translation exception trying to access the configuration virtual storage areas.

0101 hex: An initiate configuration dump Ultravisor Call has not completed on the secure configuration specified.

0102 hex: Access exception recognized when accessing the secure configuration storage dump area.

0103 hex: The secure configuration absolute address is, e.g., greater than the secure configuration storage length.

When a special select unique component (e.g., special tweak component) is stored, select bytes (e.g., bytes 14-15) include flags providing information about how to interpret the corresponding unit of memory (e.g., 4K-byte block of storage). Example flags include:

Bit Description

15 Zero Page

The corresponding unit of memory (4K-byte block of storage) has not been stored to by the secure configuration and it's contents may be assumed to be zeros (or another select value).

14 Shared Page

The corresponding unit of memory (4K-byte block of storage) is defined shared storage and is not encrypted.

13 Page Mapped

The corresponding unit of memory (4K-byte block of storage) has a valid mapping to a secure page.

The dump configuration storage state command dumps the select unique component values (e.g., tweak component values) and status flags per page for a given amount of guest memory.

In one example, the dump configuration storage state Ultravisor Call command stores, e.g., 256 select unique component values (e.g., tweak component values) to the secure configuration dump area starting with the select unique value (e.g., tweak) for the unit of memory (e.g., 4K-byte block of storage) specified by the secure configuration absolute address. The size of the configuration dump area specified can be obtained from, for instance, a query ultravisor information Ultravisor Call command.

The dump configuration storage state Ultravisor Call is used to dump, e.g., 16-byte select unique component values (e.g., tweak component values) used to derive the select unique values (e.g., tweak values) used when encrypting or decrypting the contents of unit of memory (e.g., 4K-byte blocks) of secure configuration storage. The select unique component values are output in order starting with the value that corresponds to the unit of memory starting at, e.g., absolute address zero within the secure configuration. If, e.g., bytes 0-3 of the select unique component value is, e.g., 'FFFFFFFF' hex, the unit of memory has no specified select unique value and, e.g., bytes 14-15 of the select unique component value contain flags which provide more information about how the corresponding unit of memory should be interpreted. If the select unique component value is any other value, the OR of the select unique component value and the decrypted select unique value nonce (e.g., tweak nonce) obtained from, e.g., a complete configuration dump Ultravisor Call is to be used as the select unique value for an AES-XTS operation.

Returning to FIG. 2, and in particular, inquiries 220, 222, if there are no more central processing units to dump or if there is no more memory to dump, then a complete configuration dump call (also referred to as a complete request) is made 240. For instance, the Ultravisor Call instruction is issued by, e.g., the hypervisor specifying a complete configuration dump control block which specifies a complete configuration dump command to be executed by the ultravisor. One example of such a control block is described with reference to FIG. 6.

In one example, a complete configuration dump Ultravisor Call control block 600 includes, for instance, the following fields:

Length 602: This field (e.g., bytes 0-1) includes, e.g., an unsigned binary integer (e.g., 16 bits) whose value specifies the length of the control block in bytes. The length is to specify a select value (e.g., a value of 64+N bytes); otherwise, a select response code (e.g., 0005 hex) applies. The value N may be obtained from the configuration finalize dump length returned by, for instance, a query ultravisor information Ultravisor Call command.

Command Code 604: This field (e.g., bytes 2-3) includes an unsigned binary integer (e.g., 16 bits) whose value specifies the command code for the complete configuration state dump Ultravisor Call command.

Response Code 606: This field (e.g., bytes 4-5) includes an unsigned binary integer (e.g., 16 bits) which specifies a response code. This value is stored when the operation completes.

Return Reason Code 608: This field (e.g., bytes 6-7) includes the return reason code. For the complete configuration dump Ultravisor Call command, this field is, e.g., zero.

Secure Configuration Context Handle 609: This field (e.g., bytes 24-31) includes a value (e.g., a 64-bit value) that identifies the secure configuration whose dump is to be completed.

Key Derivation Seed 610: This field (e.g., bytes 64-127) includes the seed used to derive the dump key used to encrypt the central processing unit state as well as the data in this control block.

Initialization Vector 612: This field (e.g., bytes 128-143) includes the initialization vector used when encrypting the data stored by this Ultravisor Call.

Tweak Nonce (a.k.a., select unique nonce) 614: This field (e.g., bytes 144-159) includes the nonce value used for the select unique values (e.g., tweak values). This value is to be ORed with each non-special select unique component (e.g., tweak component) to create the select unique values used to encrypt the unit of memory (e.g., 4K-byte block of storage).

Storage Encryption Key 1 (616): This field (e.g., bytes 160-191) includes the first AES-256 XTS key used to encrypt the select unique values (e.g., tweak values) that are then subsequently used to decrypt the dumped unit of memory (e.g., 4K-byte block of storage).

Storage Encryption Key 2 (618): This field (e.g., bytes 192-223) includes the second AES-256 XTS key used along with the encrypted select unique value (e.g., tweak value) to decrypt the unit of memory (e.g., 4K-byte blocks of storage). In one example, Storage Encryption Key 1 combined with Storage Encryption Key 2 is the paging key.

Authentication Tag 620: This field (e.g., bytes 256-271) includes an AES-GCM authentication tag derived from using the authenticated values (e.g., bytes 64-143) as additionally authenticated data and then computing the remainder of the tag from the encrypted fields (e.g., bytes 144-255).

If a special condition exists, a response code other than a select code (e.g., 0001 hex) is stored in the Ultravisor Call control block. Special conditions for the complete configuration dump Ultravisor Call include, for instance:

0003 hex: The complete configuration dump Ultravisor Call command was issued in a configuration that has not issued a successfully executed initialize Ultravisor Call command.

0005 hex: The complete configuration dump Ultravisor Call command was issued with a length that is not equal to a select value (e.g., 130 hex).

0020 hex: The secure configuration context handle is not a valid handle for a defined secure configuration.

0101 hex: An initiate configuration dump Ultravisor Call has not completed on the secure configuration specified.

The complete configuration dump Ultravisor Call is used to complete dump processing for the specified secure configuration. The call returns the data which is used by the customer to decrypt the dump and check its integrity. It also completes the dump process and hence allows the initiation of a new dump process via the initiate configuration dump call. It includes, for instance, the key derivation seed that was used to create the dump key so the owner of the virtual machine can calculate the dump key itself. Also, it includes the initialization vector used to encrypt the encrypted parts of the returned data and an authentication tag which should be used to verify the contents of the authenticated and encrypted data. The encrypted parts include, for instance, the selected unique value nonce which is to be ORed into each of the select unique values from the dump memory state call, as well as the AES XTS (Advanced Encryption Standard XEX Tweakable Block Cipher with Ciphertext Stealing) key used to encrypt those select unique values.

As described herein, a secure virtual machine may be dumped while maintaining the security of the dumped virtual machine's state by encrypting the dump before it is readable by an untrusted entity. To securely facilitate a dump of a secure virtual machine, a dump application programming interface is employed. The interface uses a plurality of calls, and each call points to a control block, examples of which are described herein. Each control block/area described herein may include additional, fewer and/or other fields in one or more embodiments. Further, each field may be in a different position within the control block/area and/or be of a different size or data type. Further, the control block/area may include one or more reserved fields. Many variations are possible.

In one or more aspects, memory of a virtual machine may be dumped using multiple techniques. For instance, one technique includes directly encrypting the memory with a dump key. With this technique, referred to as central processing unit memory encryption, a secure virtual machine's pages are encrypted. The secure virtual machine's key and the hypervisor's key differ, so if the hypervisor reads or writes the result, it is random data. For optimal security, the encryption key never leaves the central processing unit's memory controller and hence it cannot be used to dump the secure virtual machine's memory since only the central processing unit the virtual machine is currently run on could decrypt the pages. Additionally, the key is cleared when the secure virtual machine is stopped.

This protection mechanism leaves one technique to dump secure virtual machine memory since the key used to access the secure virtual machine memory generally cannot be exported: encrypting it with a special dump key that can be exported to replace the non-exportable access key. If a page has been swapped to disk, it is to be brought back into the guest's memory in order to decrypt and re-encrypt it. This creates additional memory pressure and costs processor cycles to encrypt/decrypt.

Another technique used to dump memory of a secure virtual machine, in accordance with one or more aspects, is referred to as memory protection which denies access to a secure virtual machine's page except for the secure virtual machine that the page belongs to and the trusted firmware (e.g., ultravisor) until it has been encrypted after a request to the firmware by the hypervisor. After encryption, the page is not available to the secure virtual machine anymore but can be written to disk by the hypervisor. Similarly, a request to the firmware is used to decrypt, integrity check and map the encrypted page back into the secure virtual machine so it can access it again.

This protection mechanism is able to use the same key used when encrypting pages for swapping for dumping. This means that once pages are encrypted they only need to be brought back into the guest if the guest wants to access them again. Pages that are not yet encrypted are to be encrypted, but pages that are already encrypted, no matter if they are still in memory or already on disk can directly be written to a dump. This results in a considerable decrease in CPU cycles needed for the dump if pages are already paged to disk. Encryption specific data is to be exported in order to decrypt the pages later when examining the dump. Such data, e.g., can include select unique values (e.g., the tweak values) for each page of memory.

In contrast to a store of diagnostic state written by a failed kernel inside the virtual machine, a store of diagnostic state, as described herein in one or more aspects, is generated outside of the virtual machine by the hypervisor. It is either triggered by the owner of the virtual machine or automatically when the hypervisor has determined that the virtual machine has failed and is not executing code normally.

One or more aspects of the present invention are inextricably tied to computer technology and facilitate processing within a computer, improving performance thereof. Processing is facilitated by securely storing diagnostic state of a virtual machine (e.g., a secure virtual machine) in a manner that is less complex, uses fewer processing cycles and improves performance, while maintaining security.

Further details of one embodiment of facilitating processing within a computing environment, as it relates to one or more aspects of the present invention, are described with reference to FIGS. 7A-7C.

Referring to FIG. 7A, in one embodiment, at least one request to store diagnostic state of a virtual machine is obtained 700. Based on obtaining the at least one request, a store of diagnostic state of the virtual machine is performed to provide stored diagnostic state of the virtual machine 702. The performing the store includes, for instance, encrypting the diagnostic state of the virtual machine that is unencrypted and being stored to prevent a reading of the diagnostic state of the virtual machine by an untrusted entity prior to encrypting the diagnostic state of the virtual machine that is unencrypted and being stored 704.

Diagnostic state of a virtual machine (e.g., a secure virtual machine) may be stored while maintaining the security of the state of the virtual machine which is being stored for diagnostic purposes.

As examples, the stored diagnostic state of the virtual machine includes contents of memory of the virtual machine 706 and/or the stored diagnostic state of the virtual machine includes contents of one or more processor registers of the virtual machine 708.

In one example, an initiate store diagnostic state request to initiate storing of diagnostic state of the virtual machine is obtained 710. The initiate store diagnostic state request is to be used to obtain a first encryption key to be used in encrypting at least a portion of the diagnostic state of the virtual machine that is unencrypted and being stored 712.

In one example, referring to FIG. 7B, the obtaining the at least one request includes obtaining a store diagnostic processor state request 720. Based on obtaining the store diagnostic processor state request, the performing the store of the diagnostic state includes, for instance, encrypting at least select contents of at least one processor of the virtual machine using the first encryption key to provide encrypted processor contents 722, and storing the encrypted processor contents 724.

In one example, the obtaining the at least one request includes obtaining a convert from secure memory request 726. Based on obtaining the convert from secure memory request, the performing the store of the diagnostic state includes, for instance, encrypting at least select contents of memory of the virtual machine that are unencrypted using a second encryption key to provide encrypted contents of memory 730, and storing the encrypted contents of memory 732.

As an example, the performing the store of the diagnostic state, based on obtaining the convert from secure memory request, includes, for instance, determining whether a unit of memory for which contents are to be stored is encrypted 736, and encrypting the unit of memory using the second encryption key, based on determining the unit of memory is unencrypted, wherein units of memory that are encrypted are not re-encrypted 738.

By encrypting the unencrypted contents (and not re-encrypting encrypted state), processing cycles and complexity are reduced, improving system performance.

In one example, referring to FIG. 7C, the stored diagnostic state includes encrypted contents of memory 750. Further, in one example, a store diagnostic memory state request is obtained 752, and based on obtaining the store diagnostic memory state request, metadata to be used to decrypt the encrypted contents of memory is stored 754.

As an example, the metadata includes one or more select component values to be used to create one or more select values to be used to decrypt the encrypted contents of memory 756.

In one example, a complete request to complete the storing of diagnostic state is obtained 760, and based on obtaining the complete request, data to be used to decrypt encrypted stored diagnostic state of the virtual machine is provided 762.

As an example, the data includes a second encryption key used in decryption of encrypted contents of memory and a nonce value to be used to create one or more select values to be used in encryption 770. Further, in one example, at least a portion of the data is encrypted 772.

Other variations and embodiments are possible.

Figure 8A:
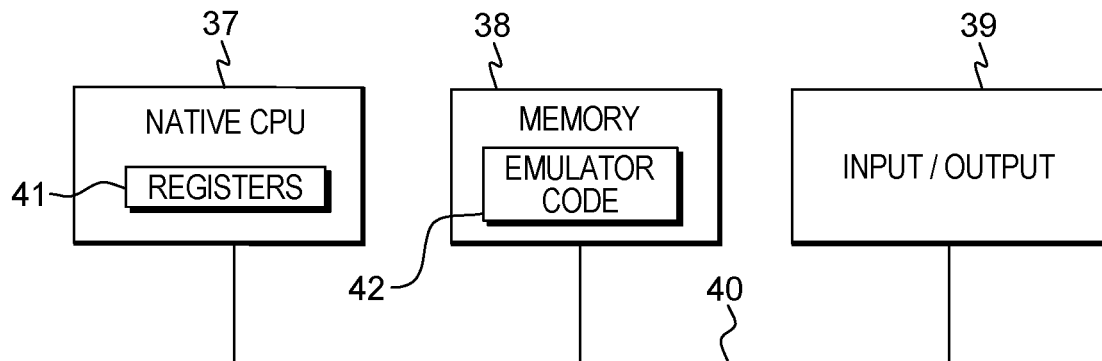
FIG. 8A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 8A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, New York; an HP Superdome with Intel® Itanium® II processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as PowerPC processors, HP Superdome servers or others, to emulate the z/Architecture instruction set architecture and to execute software and instructions developed based on the z/Architecture instruction set architecture.

Figure 8B:
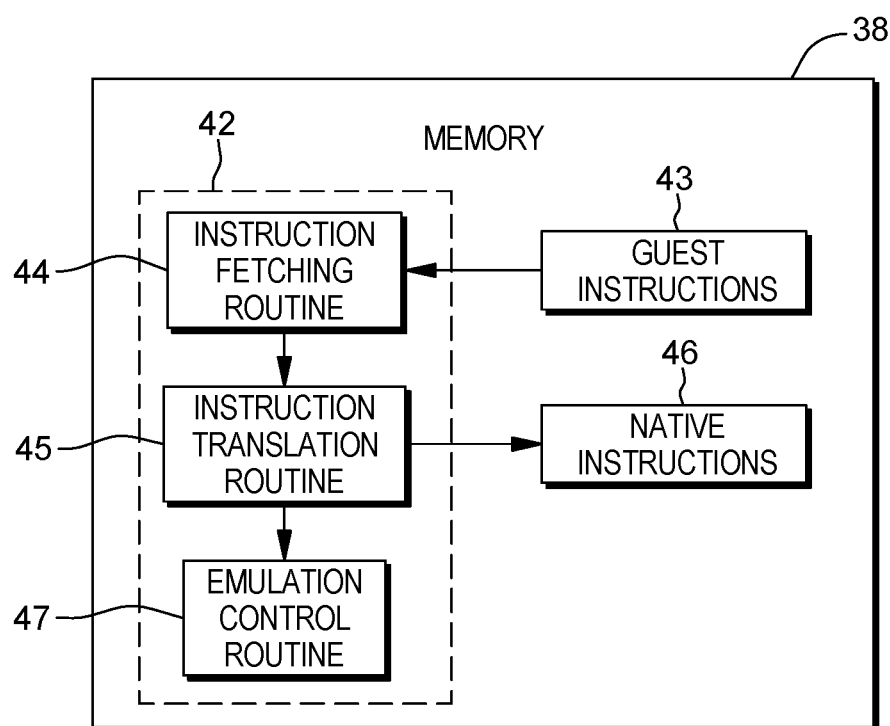
FIG. 8B depicts further details of the memory of FIG. 8A, in accordance with one or more aspects of the present invention.

Further details relating to emulator code 42 are described with reference to FIG. 8B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An instruction, command or call that may be emulated includes the Ultravisor Calls described herein, in accordance with one or more aspects of the present invention. Further, other instructions, commands, functions, operations, calls and/or one or more aspects of the present invention may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
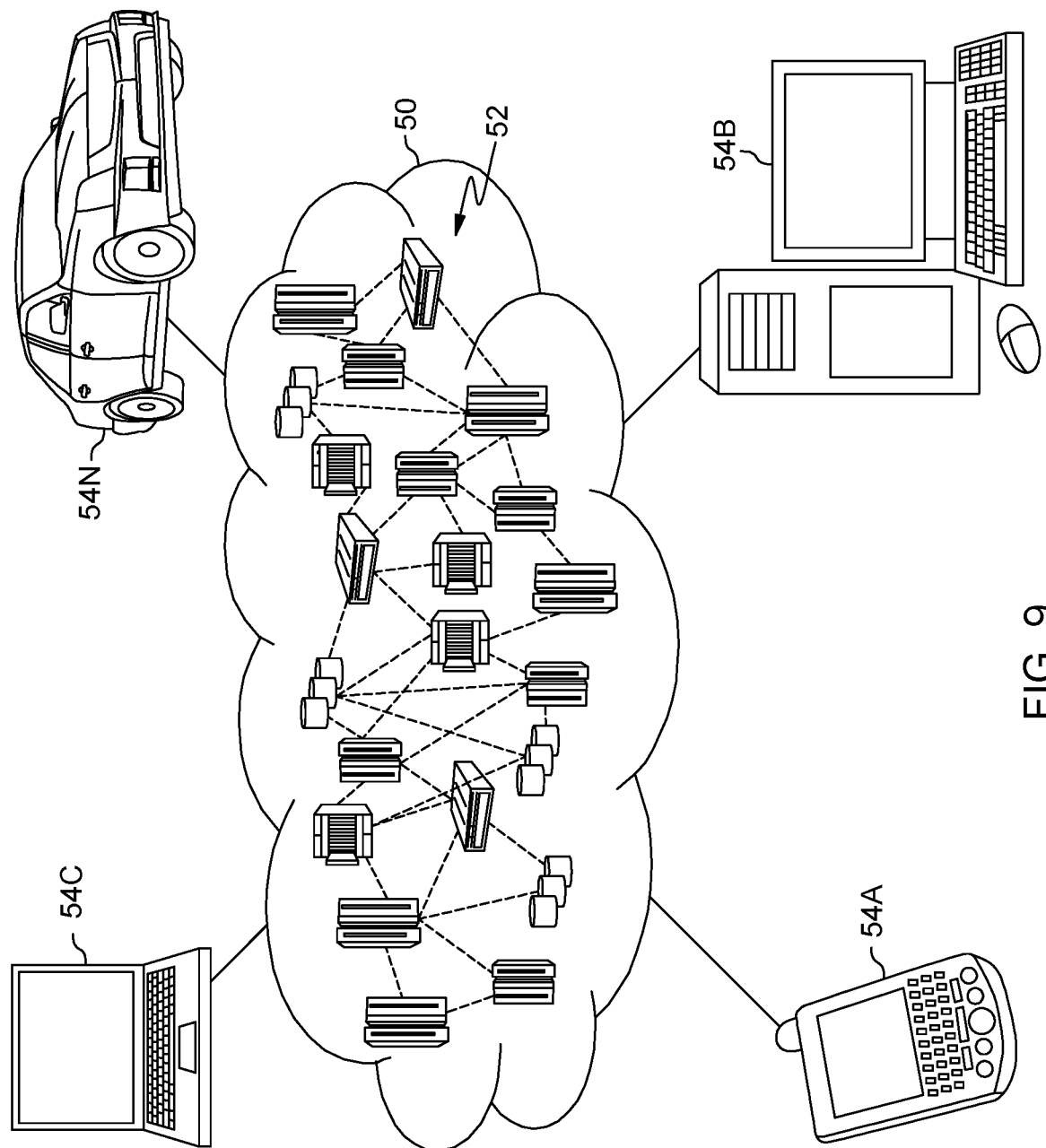
FIG. 9 depicts one embodiment of a cloud computing environment, in accordance with one or more aspects of the present invention.

Referring now to FIG. 9, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 52 and cloud computing environment 50 can communicate with any type of computerized device over any type of network and/or network addressable connection (e.g., using a web browser).

Figure 10:
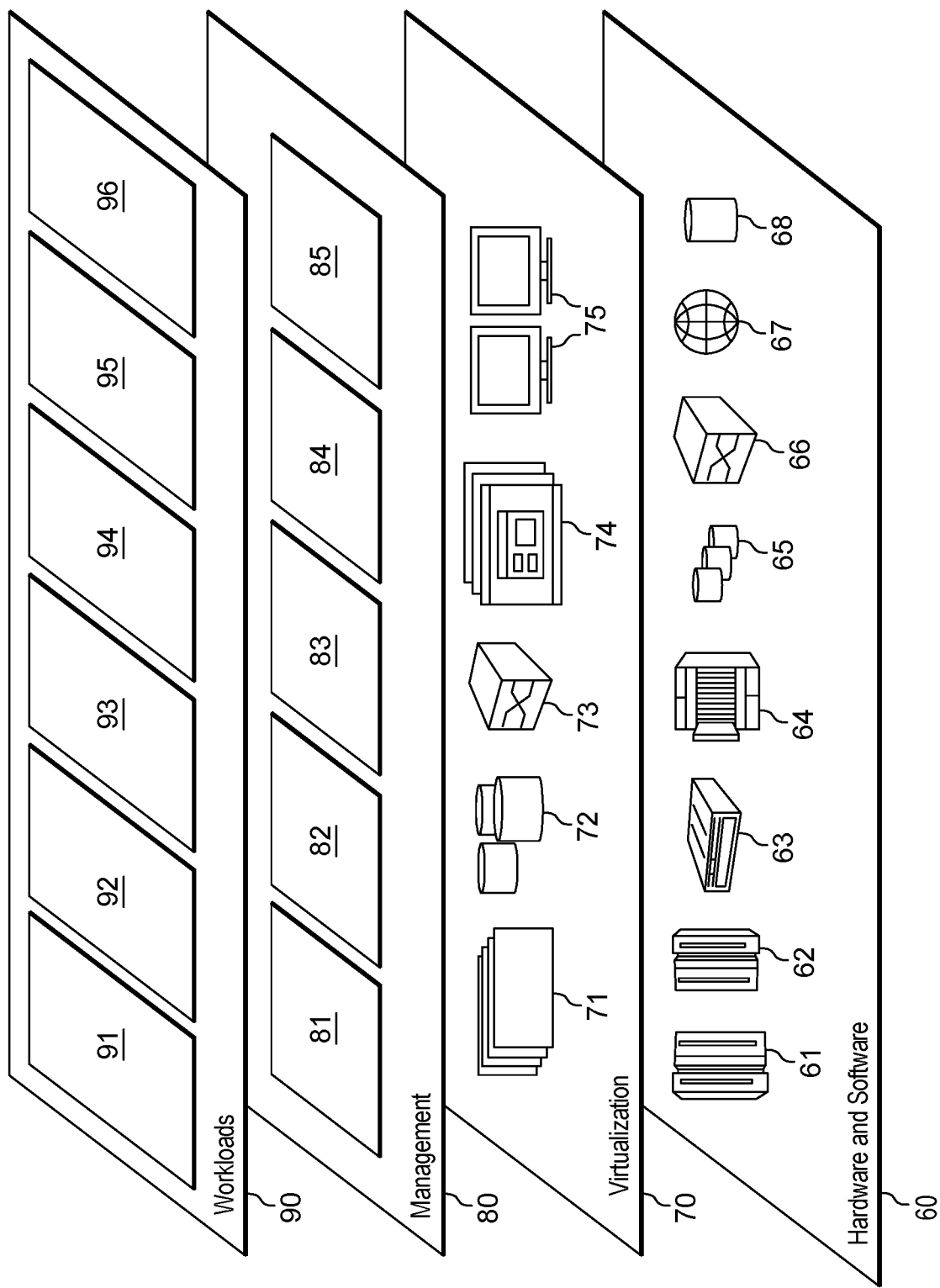
FIG. 10 depicts one example of abstraction model layers, in accordance with one or more aspects of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure virtual machine dump processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions, commands, functions, calls and/or operations may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
one or more computer readable storage media and program instructions collectively stored on the one or more computer readable storage media to perform a method comprising:
obtaining at least one request to store diagnostic state of a virtual machine; and
performing, based on obtaining the at least one request, the store of the diagnostic state of the virtual machine to provide stored diagnostic state of the virtual machine, wherein the performing the store includes encrypting the diagnostic state of the virtual machine that is unencrypted and being stored to prevent a reading of the diagnostic state of the virtual machine by an untrusted entity prior to encrypting the diagnostic state of the virtual machine that is unencrypted and being stored, and wherein the performing the store of the diagnostic state comprises:
determining that a unit of memory for which contents are to be stored is unencrypted; and
encrypting the unit of memory, based on determining that the unit of memory is unencrypted, wherein units of memory that are encrypted are not re-encrypted.

2. The computer program product of claim 1, wherein the stored diagnostic state of the virtual machine includes contents of memory of the virtual machine.

3. The computer program product of claim 1, wherein the stored diagnostic state of the virtual machine includes contents of one or more processor registers of the virtual machine.

4. The computer program product of claim 1, wherein the method further comprises obtaining an initiate store diagnostic state request to initiate storing of the diagnostic state of the virtual machine, the initiate store diagnostic state request to be used to obtain a first encryption key to be used in encrypting at least a portion of the diagnostic state of the virtual machine that is unencrypted and being stored.

5. The computer program product of claim 4, wherein the obtaining the at least one request includes obtaining a store diagnostic processor state request, and wherein based on obtaining the store diagnostic processor state request, the performing the store of the diagnostic state includes:
encrypting at least select contents of at least one processor of the virtual machine using the first encryption key to provide encrypted processor contents; and
storing the encrypted processor contents.

6. The computer program product of claim 1, wherein the obtaining the at least one request includes obtaining a convert from secure memory request, and wherein based on obtaining the convert from secure memory request, the performing the store of the diagnostic state includes:
encrypting at least select contents of memory of the virtual machine that are unencrypted using a second encryption key to provide encrypted contents of memory, the encrypted contents of memory including the unit of memory; and
storing the encrypted contents of memory.

7. The computer program product of claim 1, wherein the obtaining the at least one request includes obtaining a convert from secure memory request, and wherein based on obtaining the convert from secure memory request, the performing the store of the diagnostic state includes
encrypting the unit of memory using a second encryption key.

8. The computer program product of claim 1, wherein the stored diagnostic state includes encrypted contents of memory, and wherein the method further comprises:
obtaining a store diagnostic memory state request; and
storing, based on obtaining the store diagnostic memory state request, metadata to be used to decrypt the encrypted contents of memory.

9. The computer program product of claim 8, wherein the metadata includes one or more select component values to be used to create one or more select values to be used to decrypt the encrypted contents of memory.

10. The computer program product of claim 1, wherein the method further includes:
obtaining a complete request to complete the storing of the diagnostic state; and
providing, based on obtaining the complete request, data to be used to decrypt encrypted stored diagnostic state of the virtual machine.

11. The computer program product of claim 10, wherein the data includes a second encryption key used in decryption of encrypted contents of memory and a nonce value to be used to create one or more select values to be used in encryption, and wherein at least a portion of the data is encrypted.

12. The computer program product of claim 1, wherein the state of the virtual machine includes select secure configuration data of the virtual machine.

13. The computer program product of claim 1, wherein the virtual machine is a secure virtual machine in which access to the state of the secure virtual machine is denied except for limited memory areas designated as shared by the secure virtual machine.

14. A computer system for facilitating processing within a computing environment, the computer system comprising:
a memory; and
at least one processor in communication with the memory, wherein the computer system is configured to perform a method, said method comprising:
obtaining at least one request to store diagnostic state of a virtual machine; and
performing, based on obtaining the at least one request, the store of the diagnostic state of the virtual machine to provide stored diagnostic state of the virtual machine, wherein the performing the store includes encrypting the diagnostic state of the virtual machine that is unencrypted and being stored to prevent a reading of the diagnostic state of the virtual machine by an untrusted entity prior to encrypting the diagnostic state of the virtual machine that is unencrypted and being stored, and wherein the performing the store of the diagnostic state comprises:
determining that a unit of memory for which contents are to be stored is unencrypted; and
encrypting the unit of memory, based on determining that the unit of memory is unencrypted, wherein units of memory that are encrypted are not re-encrypted.

15. The computer system of claim 14, wherein the method further comprises obtaining an initiate store diagnostic state request to initiate storing of the diagnostic state of the virtual machine, the initiate store diagnostic state request to be used to obtain a first encryption key to be used in encrypting at least a portion of the diagnostic state of the virtual machine that is unencrypted and being stored.

16. The computer system of claim 15, wherein the obtaining the at least one request includes obtaining a store diagnostic processor state request, and wherein based on obtaining the store diagnostic processor state request, the performing the store of the diagnostic state includes:
encrypting at least select contents of at least one processor of the virtual machine using the first encryption key to provide encrypted processor contents; and
storing the encrypted processor contents.

17. The computer system of claim 14, wherein the obtaining the at least one request includes obtaining a convert from secure memory request, and wherein based on obtaining the convert from secure memory request, the performing the store of the diagnostic state includes:
encrypting at least select contents of memory of the virtual machine that are unencrypted using a second encryption key to provide encrypted contents of memory, the encrypted contents of memory including the unit of memory; and
storing the encrypted contents of memory.

18. The computer system of claim 14, wherein the stored diagnostic state includes encrypted contents of memory, and wherein the method further comprises:
obtaining a store diagnostic memory state request; and
storing, based on obtaining the store diagnostic memory state request, metadata to be used to decrypt the encrypted contents of memory.

19. A computer-implemented method of facilitating processing within a computing environment, the computer-implemented method comprising:
obtaining at least one request to store diagnostic state of a virtual machine; and
performing, based on obtaining the at least one request, the store of the diagnostic state of the virtual machine to provide stored diagnostic state of the virtual machine, wherein the performing the store includes encrypting the diagnostic state of the virtual machine that is unencrypted and being stored to prevent a reading of the diagnostic state of the virtual machine by an untrusted entity prior to encrypting the diagnostic state of the virtual machine that is unencrypted and being stored, and wherein the performing the store of the diagnostic state comprises:
determining that a unit of memory for which contents are to be stored is unencrypted; and
encrypting the unit of memory, based on determining that the unit of memory is unencrypted, wherein units of memory that are encrypted are not re-encrypted.

20. The computer-implemented method of claim 19, wherein the method further comprises obtaining an initiate store diagnostic state request to initiate storing of the diagnostic state of the virtual machine, the initiate store diagnostic state request to be used to obtain a first encryption key to be used in encrypting at least a portion of the diagnostic state of the virtual machine that is unencrypted and being stored.

21. The computer-implemented method of claim 20, wherein the obtaining the at least one request includes obtaining a store diagnostic processor state request, and wherein based on obtaining the store diagnostic processor state request, the performing the store of the diagnostic state includes:
encrypting at least select contents of at least one processor of the virtual machine using the first encryption key to provide encrypted processor contents; and
storing the encrypted processor contents.

22. The computer-implemented method of claim 19, wherein the obtaining the at least one request includes obtaining a convert from secure memory request, and wherein based on obtaining the convert from secure memory request, the performing the store of the diagnostic state includes:
encrypting at least select contents of memory of the virtual machine that are unencrypted using a second encryption key to provide encrypted contents of memory, the encrypted contents of the memory including the unit of memory; and
storing the encrypted contents of memory.

23. A computer program product for facilitating processing within a computing environment, the computer program product comprising:
- one or more computer readable storage media and program instructions collectively stored on the one or more computer readable storage media to perform a method comprising:
  - obtaining, by a trusted entity, at least one request issued by a hypervisor to store selected diagnostic state of a virtual machine, the hypervisor being an untrusted entity to the virtual machine and the trusted entity being trusted by the virtual machine, and wherein the selected diagnostic state includes state of the virtual machine to be used to find a root cause of a failure of the virtual machine; and
  - performing, using the trusted entity, based on obtaining the at least one request, the store of the selected diagnostic state of the virtual machine, wherein the performing the store of the selected diagnostic state includes encrypting unencrypted diagnostic state of the virtual machine selected to be stored to prevent a reading of the unencrypted diagnostic state of the virtual machine selected to be stored by the untrusted entity prior to encrypting the unencrypted diagnostic state of the virtual machine selected to be stored.

24. The computer program product of claim 23, wherein encrypted diagnostic state of the virtual machine to be stored is not re-encrypted.

25. A computer-implemented method of facilitating processing within a computing environment, the computer-implemented method comprising:
- obtaining, by a trusted entity, at least one request issued by a hypervisor to store selected diagnostic state of a virtual machine, the hypervisor being an untrusted entity to the virtual machine and the trusted entity being trusted by the virtual machine, and wherein the selected diagnostic state includes state of the virtual machine to be used to find a root cause of a failure of the virtual machine; and
- performing, using the trusted entity, based on obtaining the at least one request, the store of the selected diagnostic state of the virtual machine, wherein the performing the store of the selected diagnostic state includes encrypting unencrypted diagnostic state of the virtual machine selected to be stored to prevent a reading of the unencrypted diagnostic state of the virtual machine selected to be stored by the untrusted entity prior to encrypting the unencrypted diagnostic state of the virtual machine selected to be stored.

\* \* \* \* \*